United States Patent
Shih

(10) Patent No.: US 8,824,021 B2
(45) Date of Patent: Sep. 2, 2014

(54) METHOD FOR REPRODUCING DOCUMENTS AND IMAGE-PROCESSING APPARATUS

(75) Inventor: Po-Sheng Shih, Hsinchu (TW)

(73) Assignee: Avision Inc. (TW)

( * ) Notice: Subject to any disclaimer, the term of this patent is extended or adjusted under 35 U.S.C. 154(b) by 205 days.

(21) Appl. No.: 13/102,179

(22) Filed: May 6, 2011

(65) Prior Publication Data

US 2011/0292464 A1    Dec. 1, 2011

(30) Foreign Application Priority Data

May 27, 2010    (TW) ................................ 99116921 A

(51) Int. Cl.
*H04N 1/04* (2006.01)
*H04N 1/23* (2006.01)
*H04N 1/387* (2006.01)
*H04N 1/203* (2006.01)
*H04N 1/00* (2006.01)
*H04N 1/12* (2006.01)

(52) U.S. Cl.
CPC ........... *H04N 1/2307* (2013.01); *H04N 1/2369* (2013.01); *H04N 2201/0091* (2013.01); *H04N 1/387* (2013.01); *H04N 1/2032* (2013.01); *H04N 1/00713* (2013.01); *H04N 1/233* (2013.01); *H04N 1/3873* (2013.01); *H04N 1/2323* (2013.01); *H04N 1/00745* (2013.01); *H04N 1/12* (2013.01)
USPC ............ 358/449; 358/474; 358/1.2; 358/1.15

(58) Field of Classification Search
CPC combination set(s) only.
See application file for complete search history.

(56) References Cited

U.S. PATENT DOCUMENTS

| | | | | |
|---|---|---|---|---|
| 2002/0030856 A1* | 3/2002 | Kumagai | ...................... | 358/1.18 |
| 2007/0052979 A1* | 3/2007 | Burlingame | ................... | 358/1.1 |
| 2008/0278770 A1* | 11/2008 | Sakuramata et al. | ......... | 358/448 |
| 2008/0285065 A1* | 11/2008 | Baba | ............. | 358/1.13 |
| 2009/0021762 A1* | 1/2009 | Saito | ........................... | 358/1.13 |
| 2010/0033755 A1* | 2/2010 | Kamata | ....................... | 358/1.15 |

* cited by examiner

*Primary Examiner* — Tammy Pham
*Assistant Examiner* — Keara Harris

(57) ABSTRACT

A method for reproducing a document is provided. The method includes the following steps: scanning a front side and a back side of an original and accordingly producing a front side image and a back side image; determining a size of the original; comparing the size of the original with a page size; and if the size of the original is determined smaller than one half of the page size, producing one-page image data representing the front side image and the back side image on one single page. An apparatus for reproducing the document is also disclosed.

18 Claims, 7 Drawing Sheets

METHOD FOR REPRODUCING DOCUMENTS AND IMAGE-PROCESSING APPARATUS

CROSS REFERENCE TO RELATED APPLICATIONS

This application claims the benefit of the foreign application priority of Taiwan Application No. 099116921, which was filed on May 27, 2010 and is incorporated herein by reference.

BACKGROUND OF THE INVENTION

1. Field of the Invention

The present invention relates to a method and an image-processing apparatus for reproducing documents, and especially relates to a method and an image-processing apparatus for copying and scanning small-size documents, which automatically processes double-sided images into a single-page image, or prints them on the same side of paper.

2. Description of the Prior Art

Most of known digital copier, multifunction device or any other reproduction apparatus have the identification (ID) card function or the 2-in-1 function for the reproduction of ID card. If users wish to make duplicate copies of an ID card, the apparatus is switched to the ID card copy mode and activated to perform the copying procedure. The steps are explained herein below. First, the ID card is placed in a predefined area on the flatbed of the apparatus; and then the ID card copy mode is selected. When a "Start" command is input, the apparatus performs image acquisition for one side of the ID card; and when finished, the apparatus prompts the user to turn over the ID card and input "Start" command to start the image acquisition for the back side of the ID card. When the apparatus completes scans of the double sides of the ID cards, it prints the double-sided images on the same side of paper.

The above-described operation involves many steps and is time consuming. The user not only need to select the ID copy mode at the beginning of the operation, also has to wait for the completion of the image acquisition for the first side of the ID card and manually turn and align the document before awaiting the completion of the image acquisition for the second side of the ID card. If a mass collection of ID cards is required to be copied, the user has to stand by the apparatus and repeat the same operation on each of the ID cards.

SUMMARY OF THE INVENTION

Accordingly, an object of the present invention is to provide a method and an image processing apparatus for reproducing a document, which simplifies the processes of copying and scanning small-size documents, and saves time, paper and resources.

The method for reproducing a document is provided. The method includes the steps of: scanning a front side and a back side of an original and accordingly producing a front side image and a back side image; determining a size of the original; comparing the size of the original with a page size; and if the size of the original is determined smaller than one half of the page size, producing one-page image data representing the front side image and the back side image on one single page.

According to another aspect of the present invention, an image-processing apparatus for reproducing documents is provided. The apparatus generally includes at least one image-acquiring assembly, a double-sided document feeder and a processing module. The at least one image-acquiring assembly scans a front side and a back side of an original transported by the double-sided document feeder and accordingly produces a front side image and a back side image. The processing module compares a size of the original and a page size, and produces one-page image data representing the front side image and the back side image on one single page upon determining the size of the original is smaller than one half of the page size.

The present invention automatically processes the front side image and the back side image into a one-page image, based on the size of the scanned document. With such feature, the apparatus automatically processes in the ID card mode any document which is about the size of an ID card, even if the users forget to manually switch the apparatus to the ID card mode, or in the situation that the users are not familiar with the operations of the apparatus.

According to another aspect of the present invention, an image-processing apparatus with a double-sided document feeder is provided, to save the time and action associated with manual turning of the documents.

These and other objects, features and advantages of the present invention will become apparent upon consideration of the following detailed description of the preferred embodiment that is illustrated in the various figures and drawings.

DETAILED DESCRIPTION

Figure 1:
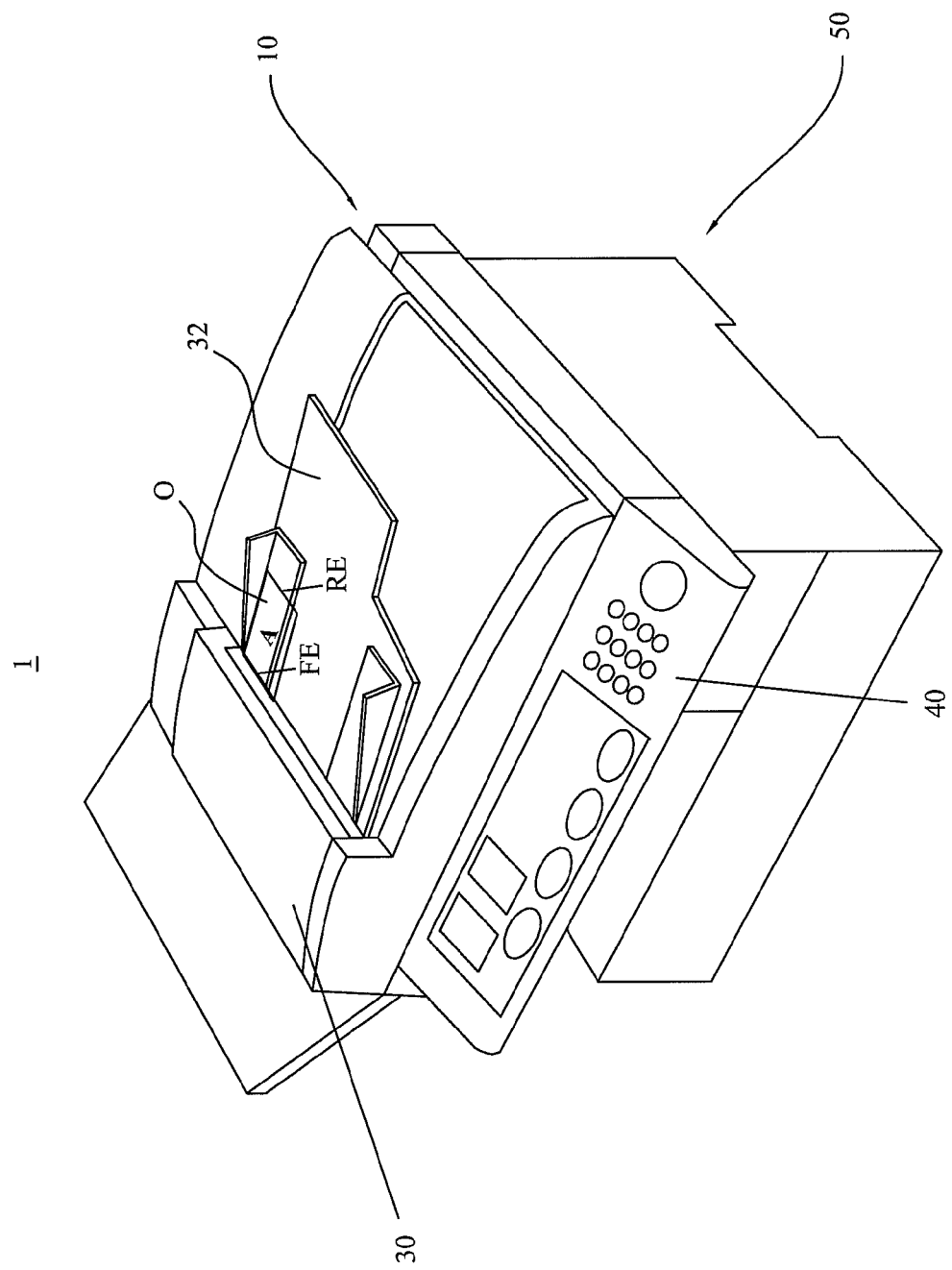
FIG. 1 is a pictorial view of an image-processing apparatus according to a preferred embodiment of the present invention.

FIG. 1 is a pictorial view of an image-processing apparatus according to a preferred embodiment of the present invention. As shown in FIG. 1, the image-processing apparatus 1 includes a scanner 10 and a printer 50. In the embodiment, the apparatus 1 is a multifunction device which is capable of scanning, printing, copying, e-mail, network filing, and etc. However, the apparatus 1 may also be any one of the image-input devices of digital copier, stand-alone scanner, fax machine, and etc. The apparatus 1 is equipped with a double-sided document feeder 30 for automatically feeding and transporting one by one a massive amount of documents, and facilitating double-sided scans of the documents, such that users do not need to manually feed in each one of the document sheets, or turn the document sheet over by hand.

Figure 2:
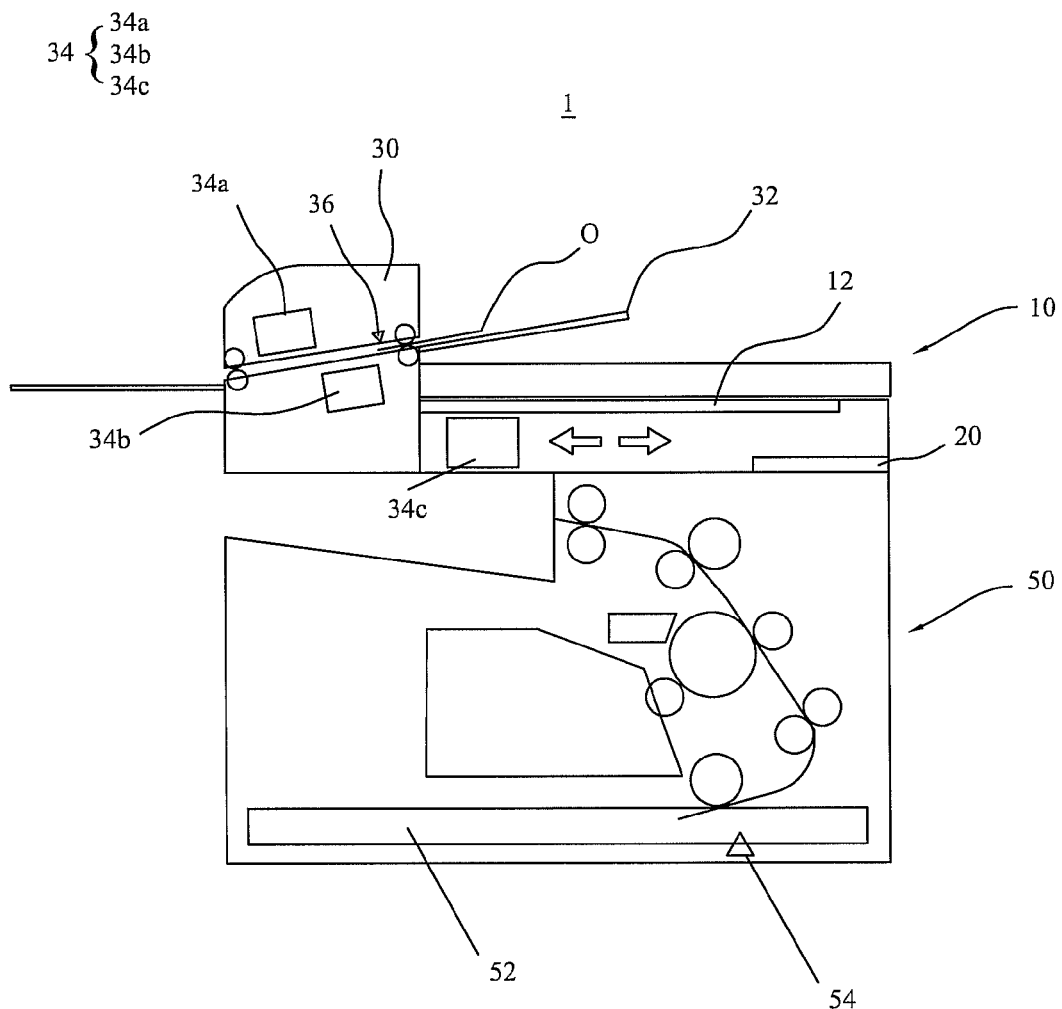
FIG. 2 is a side view of the image-processing apparatus in FIG. 1.

FIG. 2 is a side view of the image-processing apparatus in FIG. 1. As shown in FIG. 2, the apparatus 1 includes image-acquiring assemblies 34*a*, 34*b*, 34*c*, and a processing module 20. The processing module 20 processes data and controls the operation of the apparatus 1. In this embodiment, image-acquiring assemblies 34*a*, 34*b*, 34*c* are disposed in the double-sided document feeder 30 and under a platen 12. The image-acquiring assemblies 34a, 34b, 34c may include the charge-couple device type (CCD) image sensors, or the contact type image sensors (CIS).

The user can place a document sheet on a paper tray 32 of the feeder 30, or on the platen 12, when using the apparatus 1, and adjust settings and input commands via an operation interface 40. If the user operates the apparatus 1 to execute the copy function, the apparatus 1 performs an image scan on the document sheet and prints a document image on a recording medium. If the user operates the apparatus 1 to execute the scan, email, fax, or network filing functions, the apparatus 1 performs scans on the document sheet and outputs the document image to a selected destination. For example, the apparatus 1 may save the document image in the local hard drives, external hard disks, USB flash drives, or output it to an external electronic device, such as a network terminal (e.g., PC and PDA) or a file server.

Figure 3:
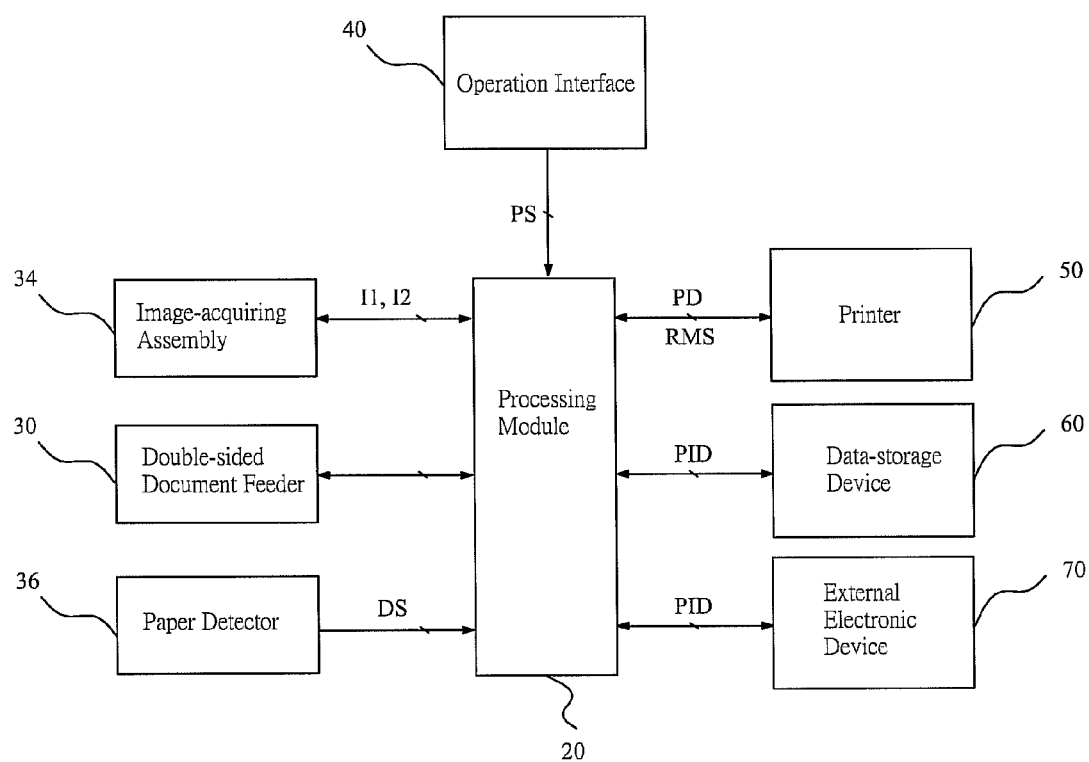
FIG. 3 is a block diagram of the image-processing apparatus according to the preferred embodiment of the present invention.

FIG. 3 is a block diagram of the image-processing apparatus according to the preferred embodiment of the present invention. In this embodiment, the present invention is described with the apparatus 1 performing sheet-feeding scanning. The double-sided document feeder 30 transports an original O to and past the image-acquiring assemblies 34a, 34b. The image-acquiring assembly 34a scans a front side of the original O and produces a corresponding front side image I1, and the image-acquiring assembly 34b scans a back side of the original O and produces a corresponding back side image I2. The processing module 20 compares a size of the original O with a page size PS. If the size of the original O is determined smaller than one half of the page size PS, the processing module produces one-page image data PID representing the front side image I1 and the back side image I2. The feeder 30 may be configured to have only one image-acquiring assembly and the feeder re-circulates the original O multiple times to complete the double-sided scans.

The size of the original O can be determined by using a paper detector 36 mounted in the document feeder 30, as shown in FIG. 2. The paper detector 36 detects a leading edge FE and a trailing edge RE of the original O, and generates a detection signal DS, according to which the processing module 20 determines the size of the original O. Alternatively, the processing module 20 may determine the size of the original O by calculating the dimensions of the front side image I1 and the back side image I2. The page size PS could be a page size of a recording medium, a default page size, or a page size inputted by the user. The recording media are loaded in a paper cassette 52 of the printer 50, and, as shown in FIG. 2, a paper detector 54 is installed in the paper cassette 52 for detecting the size of the recording media and outputting a size detection signal RMS to the processing module 20. The user could input a specified page size PS via the operation interface 40.

Figure 4B:
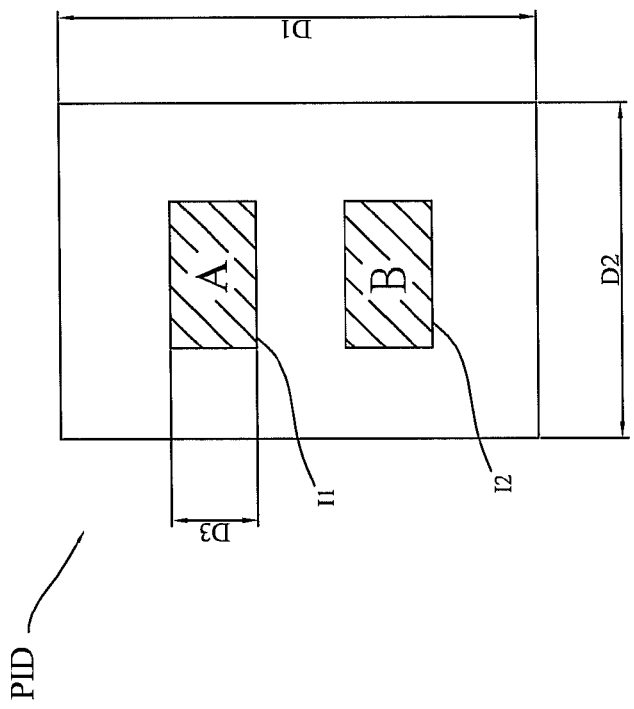
FIGS. 4A and 4B are schematic diagrams of one-page image data according to the present invention.
Figure 4A:
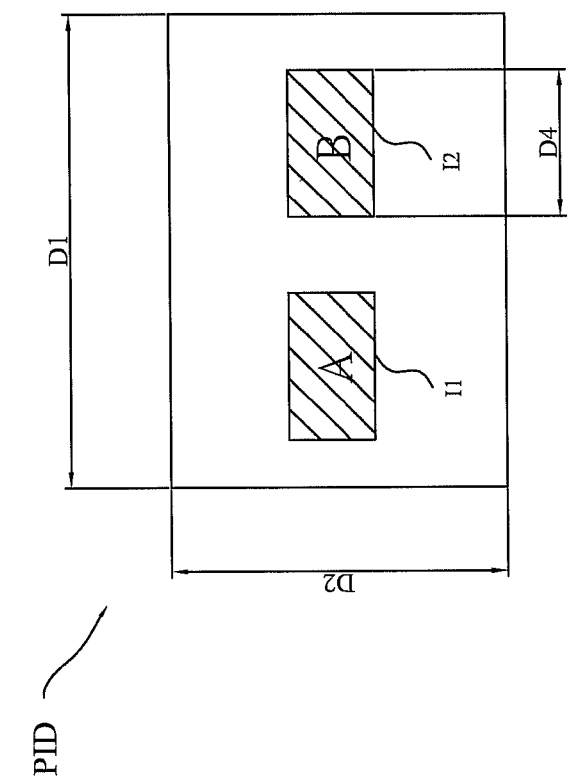

FIGS. 4A and 4B are schematic diagrams of one-page image data according to the present invention. The processing module 20 can compare the size of the original O with the page size PS based on the edge lengths or area measurements. For example, if the original O is a business card (the size thereof is 3.625"×2.125") and the page size is the standard A4 (8.27"×11.69"), the processing module 20 compares the long side (3.625") D4 (or the short side (2.125") D3) of the original O with the A4 length (11.69") D1 and determines if the long side (or the short side D3) D4 of the original O is shorter than one half of the A4 length D1. Or the processing module 20 could compare the area measurement of the original O (3.525"×2.125") with the A4 area measurement (8.27"×11.69") and determine if the area measurement of the original O is smaller than one half of the A4 area measurement. If it is determined that the size of the original O is smaller than one half of the page size PS, the processing module 20 produces the one-page image data PID which represent the front side image I1 and the back side image I2 on one single page. Referring to FIG. 4A, the front side image I1 and the backside image I2 are juxtaposed widthwise on the same page. Or the front side image I1 and the back side image I2 could be juxtaposed lengthwise, as shown in FIG. 4B. If the size of the original O is determined larger than one half of the page size PS, the processing module 20 produces multi-page image data PID which represent the front side image I1 and the back side image I2 on different pages. Under the circumstance, the front side image I1 and the back side image I2 produced may be in their full size, or being enlarged or reduced in size, in order to fit the page size PS.

Besides, if the size of the original O is determined smaller than one half of the page size PS, the apparatus 1 is switched to a ID card mode, where the processing module 20 implements the processing, such as the separation of text and graphs in the digital images, color enhancement, image cropping, and etc, to intensify the designated graphs (photos) in the image data PID. Due to the fact that small size documents are usually identification documents, and government agencies and financial institutes often scan or copy these documents for the purpose of verifying the identity of the holder, if the image data PID are processed in the way described, it would make the authentication process easier for the undertakers.

When any of the functions of scanning, email, fax, and network filing is executed, the processing module 20 outputs image data PID to at least one of an external electronic device 70 and a data-storage device 60. When the copy function is executed, the processing module 20 processes the image data PID into print data PD and the printer 50 prints the print data PD on the recording media.

Figure 5:
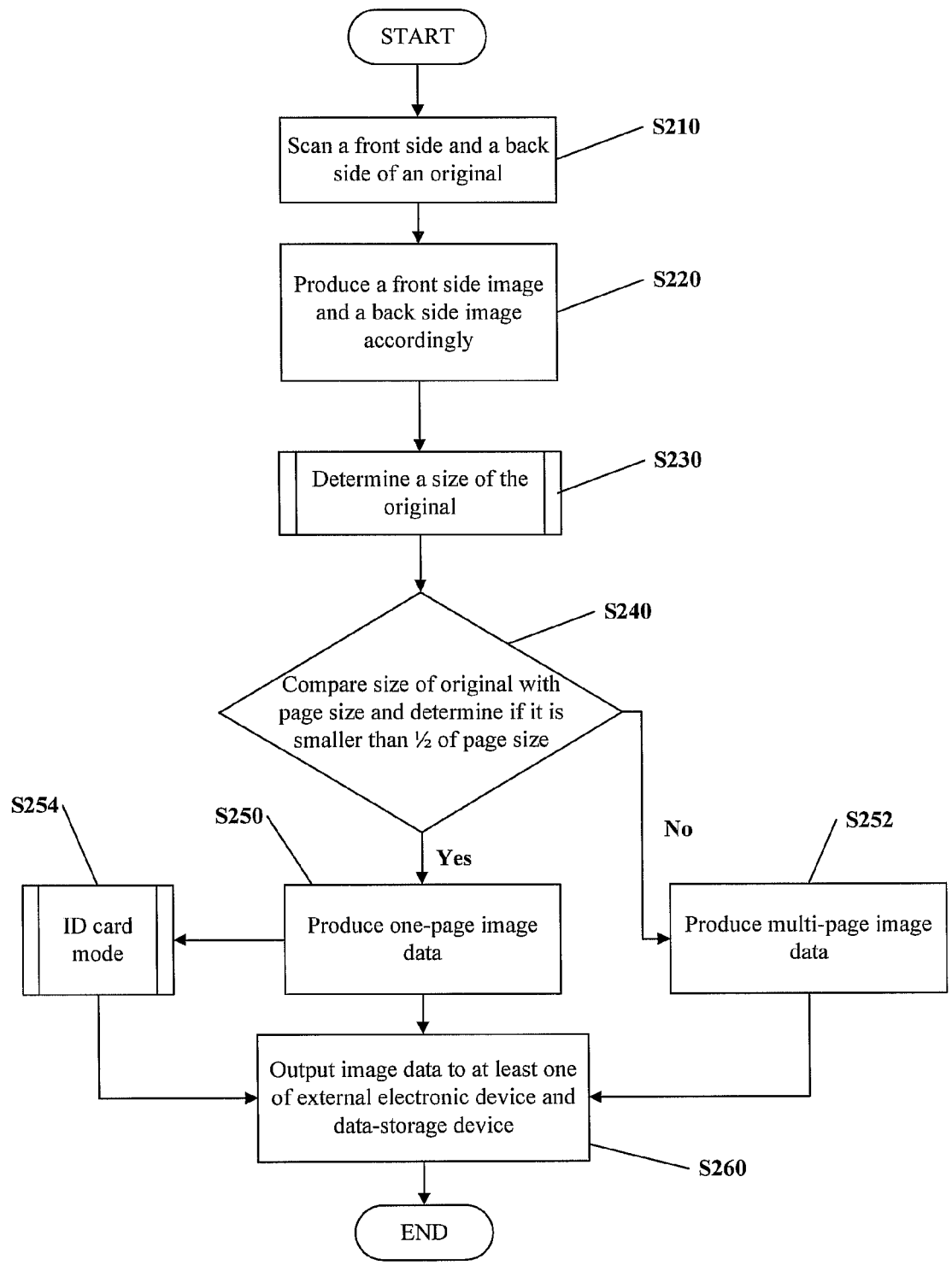
FIG. 5 is a flowchart depicting a method for reproducing a document according to a first embodiment of the present invention.
Figure 6:
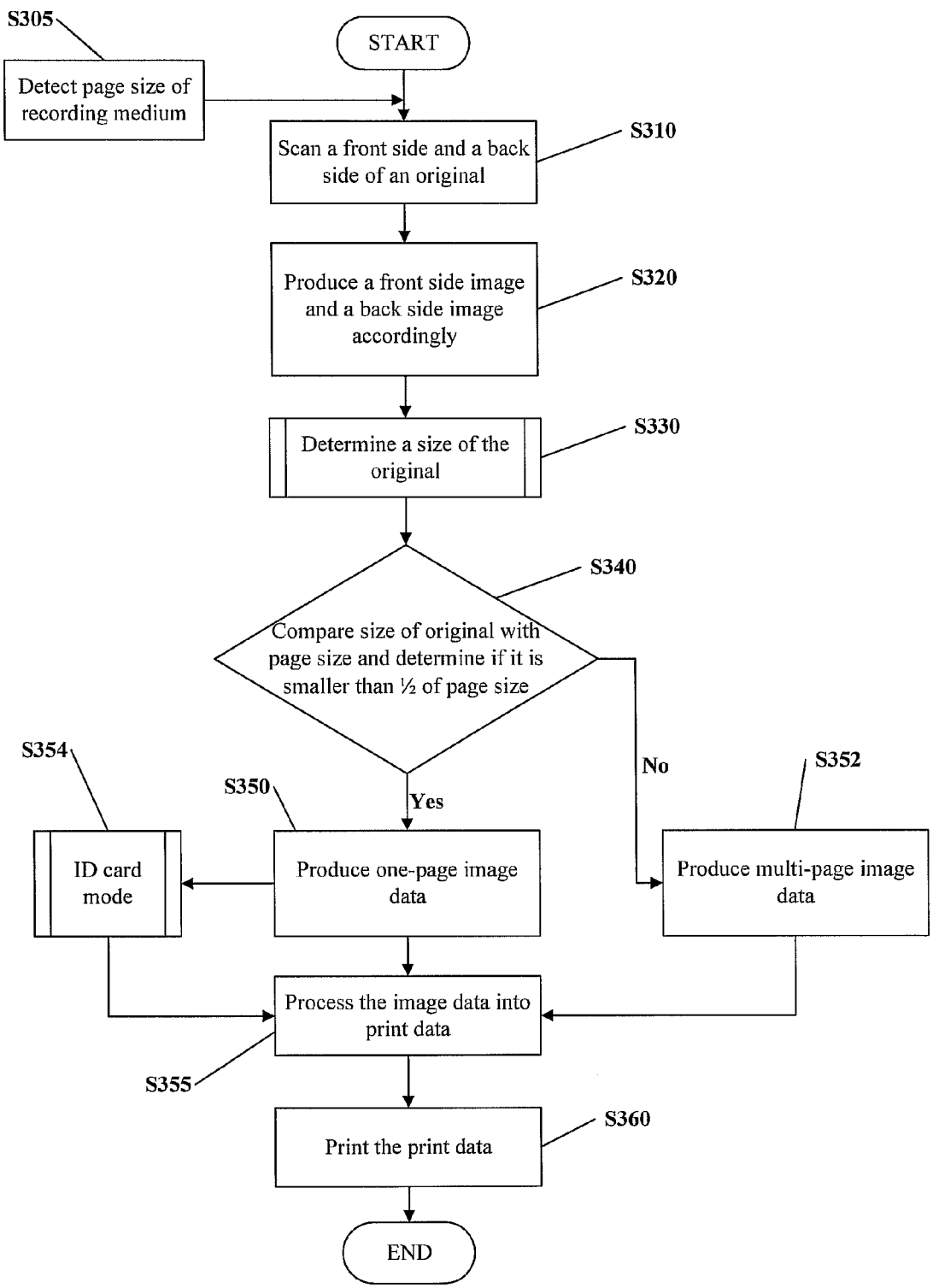
FIG. 6 is a flowchart depicting a copying method according to a second embodiment of the present invention.
Figure 7:
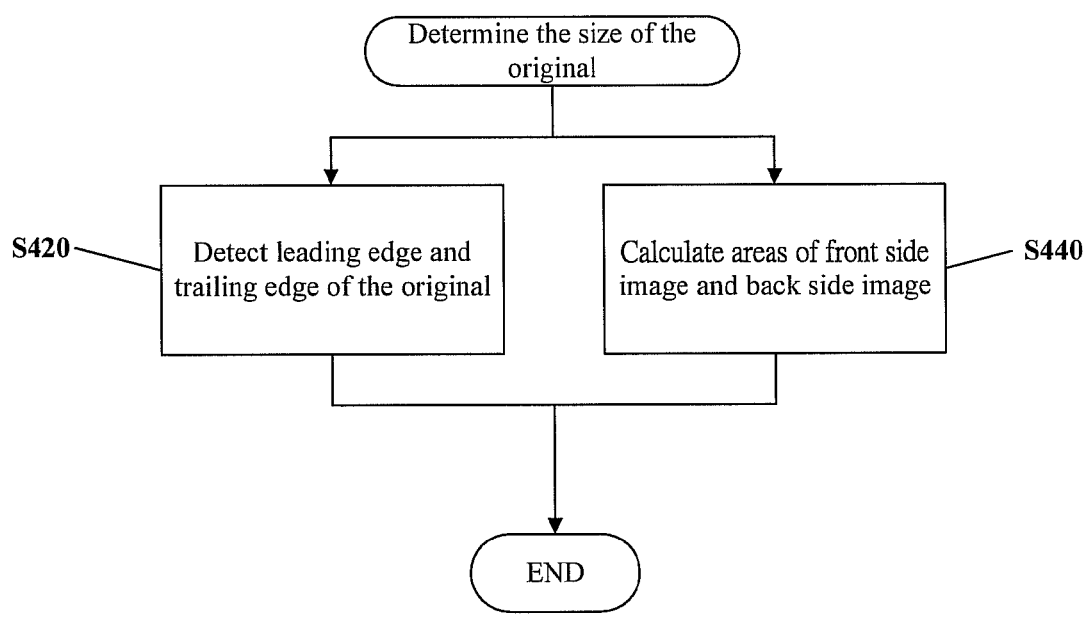
FIG. 7 is a flowchart for the process of determining the size of the original of the flowcharts of FIGS. 5 and 6.

FIG. 5 is a flowchart depicting a method for reproducing a document according to a first embodiment of the present invention. FIG. 6 is a flowchart depicting a copying method according to a second embodiment of the present invention. FIG. 7 is a flowchart for the process of determining the size of the original of the flowcharts of FIGS. 5 and 6. Referring to FIG. 5, first, in step S210, the original O is scanned; and then, in step S220, the front side image I1 and the back side image I2 corresponding to the front side and the back side of the original O are produced. In step S230, the size of the original O is determined. In step S240, the size of the original O is compared with the page size PS. If the size of the original O is determined smaller than one half of the page size PS, proceed to step S250. In step S250, the one-page image data PID representing the front side image I1 and the back side image I2 on one single page are produced. At the same time, the apparatus 1 may enter the ID card mode (step S254). If the size of the original O is determined larger than one half of the page size PS, proceed to step S252. In step S252, the multi-page image data PID representing the front side image I1 and the back side image I2 on different pages are produced. Finally, in step S260, the image data PID are outputted to at least one of the external electronic device 70 and the data-storage device 60. Before the image data PID are outputted, the image data PID are processed into specified file types or formats in accordance with the functions being executed. Please refer to FIG. 7. In determining the size of the original O, one of the following steps could be implemented. In step S420, the leading edge FE and the trailing edge RE of the original are detected. Or in step 440, the areas of the front side image I1 and the back side image I2 are calculated.

Referring to FIG. 6, steps S310 to S354 of the copying method are the same as steps S210 to S254 of the first embodiment; therefore, the detailed description of these steps will be omitted. The difference between the first embodiment and second embodiment is the addition of steps S305, S355 and S360. In step S305, the size of the recording media is detected and used to determine the page size PS. In step S355, the image data PID are processed into the print data PD; and in step S360, the print data PD are on the recording medium.

According to the present invention, the image-processing apparatus automatically processes the front side image and the back side image into a one-page image, based on the size of the scanned document. In addition, the image-processing apparatus automatically enhances the colors and contrast of the image to intensify the identification data on the document, even if the users forget to manually switch the apparatus to the ID card mode, or in the situation that the users are not familiar with the operations of the apparatus.

While the present invention has been described with respect to a limited number of embodiments, it is to be understood that the present invention is not limited to the disclosed exemplary embodiments. It is intended that the appended claims cover all modifications, equivalent structures and variations as fall within the true spirit and scope of this present invention. The specification and drawings are, accordingly, to be regarded in an illustrative rather than a restrictive sense.

What is claimed is:

1. A method for reproducing a document using an image processing apparatus, comprising the steps of:
    scanning a front side and a back side of an original and accordingly producing a front side image and a back side image;
    determining a size of the original by a processing module of the image processing apparatus;
    comparing the size of the original with a page size by the processing module after the step of determining the size of the original;
    if the size of the original is determined smaller than one half of the page size, producing one-page image data representing the front side image and the back side image, respectively corresponding to the front side and the back side of the original, on the same side of one single page after the step of comparing; and
    if the size of the original is determined larger than one half of the page size, producing multi-page image data representing the front side image and the back side image, respectively corresponding to the front side and the back side of the original, on two pages after the step of comparing, wherein the steps of producing the one-page image data and producing the multi-page image data are automatically changed by the processing module in accordance with the size of the original.

2. The method of claim 1, further comprising the step of:
    outputting the one-page image data to at least one of an external electronic device and a data-storage device.

3. The method of claim 1, further comprising the steps of:
    processing the one-page image data into print data; and
    printing the print data on a recording medium.

4. The method of claim 1, further comprising the step of:
    if the size of the original is determined smaller than one half of the page size, switching to an ID card mode where a designated graph in the one-page image data or the multi-page image data is intensified.

5. An image-processing apparatus, comprising:
    at least one image-acquiring assembly;
    a double-sided document feeder for transporting an original to and past the at least one image-acquiring assembly, wherein the at least one image-acquiring assembly scans a front side and a back side of the original and accordingly producing a front side image and a back side image; and
    a processing module for determining a size of the original and then comparing the size of the original with a page size, producing one-page image data representing the front side image and the back side image, respectively corresponding to the front side and the back side of the original, on the same side of one single page upon determining that the size of the original is smaller than one half of the page size and producing multi-page image data representing the front side image and the back side image, respectively corresponding to the front side and the back side of the original, on two pages upon determining that the size of the original is larger than one half of the page size, wherein producing the one-page image data and producing the multi-page image data are automatically changed by the processing module in accordance with the size of the original.

6. The image-processing apparatus of claim 5, wherein the processing module further outputs the one-page image data to at least one of an external electronic device and a data-storage device.

7. The image-processing apparatus of claim 5, further comprising a printer, wherein the processing module further processes the one-page image data into print data and the printer prints the print data on a recording medium.

8. The image-processing apparatus of claim 7, wherein the page size represents a page size of the recording medium.

9. The image-processing apparatus of claim 5, wherein the page size represents a default page size.

10. The image-processing apparatus of claim 5, wherein the page size represents a page size inputted by a user.

11. The image-processing apparatus of claim 5, wherein the processing module further determines the size of original based on the front side image and the back side image.

12. The image-processing apparatus of claim 5, further comprising two image-acquiring assemblies, wherein one of the two image-acquiring assemblies is disposed in the double-sided document feeder.

13. The image-processing apparatus of claim 5, wherein the processing module switches to an ID card mode upon determining that the size of the original is smaller than one half of the page size, and intensifies a designated graph in the one-page image data or the multi-page image data in the ID card mode.

14. The image-processing apparatus of claim 13, wherein the processing module implements processing, selected from the group consisting of separation of text and a graph, color enhancement and image cropping, to intensify the designated graph.

15. The method of claim 4, wherein processing, selected from the group consisting of separation of text and a graph, color enhancement and image cropping, is implemented to intensify the designated graph.

16. The method of claim 1, wherein the step of determining the size of the original is performed by:
    using a paper detector of the image-processing apparatus, which detects a leading edge and a trailing edge of the original and generates a detection signal, according to which the processing module determines the size of the original; or
    calculating dimensions of the front side image and the back side image.

17. The image-processing apparatus of claim 5, wherein the image-processing apparatus further comprises a paper detector, which detects a leading edge and a trailing edge of the original and generates a detection signal, according to which the processing module determines the size of the original.

18. The image-processing apparatus of claim 5, wherein the processing module calculates dimensions of the front side image and the back side image to determine the size of the original.

\* \* \* \* \*